United States Patent
Schmitlin et al.

(10) Patent No.: US 8,539,575 B2
(45) Date of Patent: Sep. 17, 2013

(54) TECHNIQUES TO MANAGE ACCESS TO ORGANIZATIONAL INFORMATION OF AN ENTITY

(75) Inventors: Ben Schmitlin, Redmond, WA (US); Venky Veeraravaghan, Redmond, WA (US); Lauren Antonoff, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 568 days.

(21) Appl. No.: 12/242,787

(22) Filed: Sep. 30, 2008

(65) Prior Publication Data
US 2010/0083374 A1    Apr. 1, 2010

(51) Int. Cl.
G06F 21/00    (2006.01)
(52) U.S. Cl.
USPC ............................................. 726/21
(58) Field of Classification Search
USPC .......................................... 345/853; 379/37
See application file for complete search history.

(56) References Cited

U.S. PATENT DOCUMENTS

| | | | |
|---|---|---|---|
| 6,067,548 A | 5/2000 | Cheng | |
| 6,985,955 B2 | 1/2006 | Gullotta et al. | |
| 7,251,666 B2 | 7/2007 | Morinville | |
| 7,664,233 B1 * | 2/2010 | Kirchmeier et al. | 379/37 |
| 2003/0220825 A1 | 11/2003 | Tseng | |
| 2004/0119759 A1 * | 6/2004 | Barros | 345/853 |
| 2005/0154607 A1 | 7/2005 | Terzidis et al. | |
| 2006/0005036 A1 | 1/2006 | Hu et al. | |
| 2007/0143336 A1 | 6/2007 | Lindley et al. | |
| 2007/0150514 A1 | 6/2007 | Chen et al. | |
| 2007/0174347 A1 | 7/2007 | Wenn et al. | |
| 2008/0040135 A1 | 2/2008 | VanLangen et al. | |
| 2008/0091441 A1 | 4/2008 | Flammer et al. | |

FOREIGN PATENT DOCUMENTS

| | | |
|---|---|---|
| CN | 1462969 | 12/2003 |
| CN | 1570925 | 5/2004 |

OTHER PUBLICATIONS

Chu et,al. "Authorization Management for Role-Based Collaboration", Retrieved at<<http://ieeexplore.ieee.org/iel5/8811/27913/01245633.pdf>>, 2003IEEE, pp. 4128-4134.
"HRCharter Enterprise Edition", Retrieved at<<http://www.compact.gr/Downloads/HRCharter%20Enterprise%202006%20-%20English.pdf>>, pp. 4.
"Oracle Role Manager", Retrieved at<<http://www.oracle.com/technology/products/id_mgmt/orm/pdf/oracle_role_manager_wp.pdf>>, Apr. 2008, pp. 1-12.

(Continued)

*Primary Examiner* — Brandon Hoffman
*Assistant Examiner* — Anthony Brown

(57) ABSTRACT

Techniques to manage access to organization information for an entity are described. An apparatus may include a presentation component operative to present an organizational chart on a presentation surface. The organizational chart may comprise multiple nodes associated with members of an organization, and connections between the nodes representing hierarchical relationships between the nodes. A security component may be communicatively coupled to the presentation component. The security component may be operative to receive a request to modify a characteristic of the organizational chart from an operator, access security settings for the operator, and authorize the operator to modify a characteristic of the organizational chart. Authorization may be granted, for example, when the operator is a delegate and a permission level for the delegate allows a modification operation associated with the modify request. Other embodiments are described and claimed.

20 Claims, 8 Drawing Sheets

(56) References Cited

OTHER PUBLICATIONS

"Unifi. The Leading Workforce Planning and Management Solution", Retrieved at<<http://www.aquire.com/products/unifi/>>, p. 1.
"Workflow—Position Hierarchy", Retrieved at<<http://www.coda.com/products-services/2count/Workflow/Position-Hierarchy>>, p. 1.

International Search Report for PCT Application No. PCT/US2009/055155 mailed on Apr. 12, 2010, 4 pages.
Office Action received for Chinese Patent Application No. 200980139426.2, mailed Oct. 25, 2012, 10 pgs. including 3 pgs. English translation.

* cited by examiner

600 present an organizational chart on a presentation surface, the organizational chart comprising multiple nodes associated with members of an organization, and connections between the nodes representing hierarchical relationships between the nodes
602 receive a request to modify a characteristic of the organizational chart from an operator
604 determine whether the operator is a delegate of a member from the entity
606 determine a permission level associated with the delegate
608 authorize the operator to modify the characteristic of the organizational chart in response to the modify request when the operator is a delegate and the permission level allows a modification operation associated with the modify request
608

*FIG. 6*

TECHNIQUES TO MANAGE ACCESS TO ORGANIZATIONAL INFORMATION OF AN ENTITY

BACKGROUND

The increasing size of entities such as organizations has created increasingly complex organizational structures of companies, both in terms of hierarchal relationships between individual employees and organizational relationships between project groups. Within these complex organizational structures, it is difficult for an employee to understand relationships with other employees. For example, employees may often have access only to a text-based list of all employees and their respective departments. A text-based list, however, does not easily convey the structural interrelationships between the various departments.

A graphical organizational chart may be used to present the interconnected organizational structure of an entity to the employees. Unfortunately, when an entity is very large, an organizational chart fully representing the entity may itself become very complex and difficult to understand. Additionally, generating and modifying such an organizational chart is time and cost intensive. Allowing individual users to generate and modify organizational charts may reduce time and costs. This raises security concerns, however, thereby necessitating a security model to control access to the organizational charts to ensure accuracy and confidentiality. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to manage access to organizational information of an entity. Some embodiments are particularly directed to a flexible security model for controlling access to organizational information of an entity. The flexible security model allows various administrators and end users to access organizational information, thereby allowing the organizational information to be updated in an efficient and effective manner. In this way, the security module may reduce overhead for administrators and users managing the organizational information.

In one embodiment, for example, an organizational charting system may control the creation, management, display, modification and interaction of an organizational chart for an entity. The organizational charting system may include, among other elements, a presentation component operative to present an organizational chart on a presentation surface. The organizational chart may comprise multiple nodes associated with members of an organization, and connections between the nodes representing hierarchical relationships between the nodes. A security component may be communicatively coupled to the presentation component. The security component may be operative to receive a request to modify a characteristic of the organizational chart from an operator, access security settings for the operator, and authorize the operator to modify a characteristic of the organizational chart. Authorization may be granted under various conditions, such as when the operator is a delegate and a permission level for the delegate allows a modification operation associated with the modify request, for example. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 6 illustrates an embodiment of a logic flow.

DETAILED DESCRIPTION

In order to be productive in large organizations, information workers should be consistently aware of the precise role of other people and teams in their organization. It is important that this organizational data is readily available, updated and authoritative. Building an organization structure, however, is typically a high-overhead task performed by dedicated employees of a human resources or information technology departments.

Embodiments include one or more aspects of an organizational charting system designed to allow a collaborative building of organizational data for an entity. The system includes a dedicated security model ranging from delegation to implicit permissions based on a user's position in the organization and new rules that apply to the system. The organizational charting system provides information workers and managers an opportunity to build a digital representation of their teams in a manner that reduces costs and ensures that the organizational information is richer and more current. The security model allows an organizational hierarchy to be built from the top down by a privileged user such as a human resources representative, from the bottom up by the end users, or any combination thereof.

Embodiments provide several advantages over conventional techniques. For example, the organizational charting system allows an operator to model an organization structure for a vast majority of hierarchical and matrix types of organizations. In another example, the organizational charting system may implement a security module designed to reduce overhead for administrators and operators managing the organizational information, while still allowing meaningful access to the organizational information to privileged users or end users. This ensures that managers, assistants and information workers can manage the organizational information with a level of access appropriate to their respective level of trust within an organization. As a result, the embodiments can improve affordability, scalability, modularity, extendibility, or interoperability for an operator, device or network.

Figure 1:
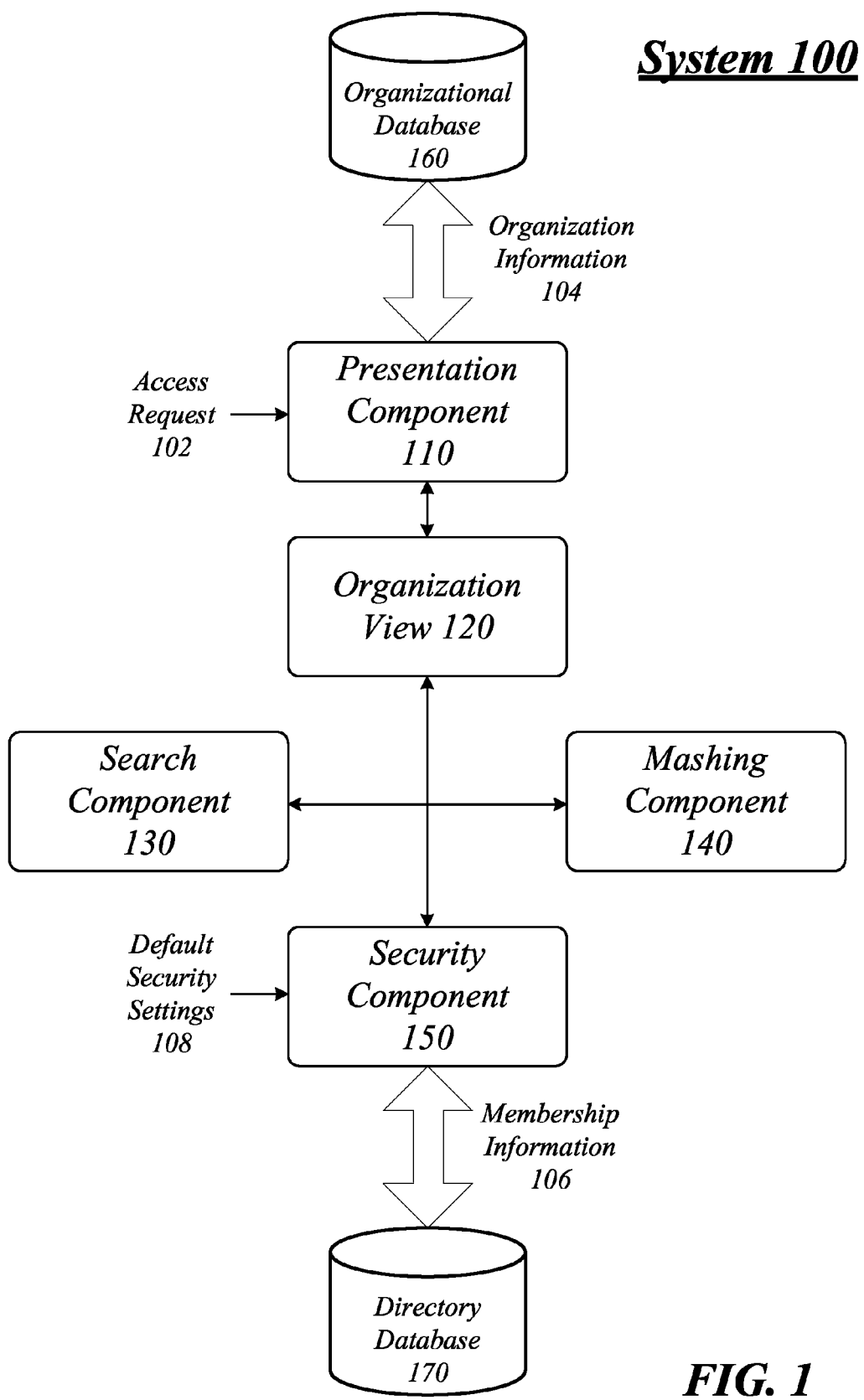
FIG. 1 illustrates an embodiment of a system.

FIG. 1 illustrates a block diagram for an organizational charting system 100 arranged to manage, modify and present organizational information for an entity. In one embodiment, for example, the organizational charting system 100 may comprise a computer-implemented system, and may include one or more components 110, 130, 140 and 150. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, one or more parts of the organizational charting system 100 may be implemented using one or more electronic devices. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the organizational charting system 100 as shown in FIG. 1 has a limited number of elements in a certain topology, it may be appreciated that the organizational charting system 100 may include more or less elements in alternate topologies as desired for a given implementation.

The various components of the organizational chart system 100 may be communicatively coupled via various types of communications media. The various components may coordinate operations between each other. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The organizational charting system 100 controls the creation, management, display, modification, and interaction of an organizational chart for an entity, such as a business entity. As shown in FIG. 1, the organizational charting system 100 may include a presentation component 110, a search component 130, a mashing component 140, a security component 150, an organizational database 160, and a directory database 170.

The organizational database 160 may be used to store in a database accessible by members of the organization, certain member data representing different members of the organization at the individual, group or project level. The organizational database 160 may also store hierarchical data representing hierarchical relationships between the members of the organization, as well as metadata associated with the members. The organizational database 160 may further store information about an entity or organization, including an organization profile, metadata for an organization, security settings for members or an entity, and any other suitable information for generating, modifying and displaying an organizational chart for the entity.

The directory database 170 may comprise a public directory of operators and/or network resources. Some common examples of the type of information published by the directory database 170 include information about an entity, members of an entity, network devices or services available to an entity or member, and so forth. In one embodiment, for example, the directory database 170 may be implemented as a MICROSOFT ACTIVE DIRECTORY®. Active Directory is an implementation of lightweight directory access protocol (LDAP) directory services to provide central authentication and authorization services for network computers. Active Directory also allows administrators to assign policies, deploy software, and apply important updates to an organization. Active Directory stores information and settings in a central database. Active Directory networks can vary from a small installation with a few hundred objects, to a large installation with millions of objects.

In various embodiments, the directory database 170 may include identifying information for the various members of an entity. The identifying information may include without limitation a name, a location, contact information, account numbers, professional information, organizational information (e.g., a title), personal information, connection information, presence information, pictures, images, video, multimedia information, a network address, a media access control (MAC) address, an Internet Protocol (IP) address, a telephone number, an email address, a protocol address (e.g., SIP address), equipment identifiers, hardware configurations, software configurations, wired interfaces, wireless interfaces, supported protocols, presence information, and other desired information.

The presentation component 110 generally allows an operator or user to interact with an organizational chart by providing controls and displaying information associated with the organizational chart. In embodiments, the presentation component 110 is operative to present an organization view 120 for an entity. The organization view 120 may include, among other user interface elements, an organizational chart on a presentation surface. The organizational chart may comprise multiple nodes associated with members of an organization. The organizational chart may further comprise various connections between the nodes representing hierarchical relationships between the nodes. The presentation component may present an organizational chart using organizational information stored by one or more databases, such as the organizational database 160 and/or the directory database 170.

The search component 130 is communicatively coupled to the presentation component 110. The search component 130 is arranged to generally control the searching of data associated with an organizational chart and the presentation of search results. The search component 130 controls and implements the searching of organizational information in response to commands received by search controls of the presentation component 110. The search component 130 may be arranged to search organizational information associated with an organizational chart that is stored in the organizational database 160. This database 160 may also include searchable metadata associated with each of the members. An inputted search query may be transited from search controls of the presentation component 110 to the search component 130. The search query may include query terms defining the information for which the user is searching. The search component 130 passes the search query to a search engine, which then queries the organizational database 160 using the query terms. The search engine may then output the results of the search to a display.

The mashing component 140 is communicatively coupled to the presentation component 110 and the search component 130. The mashing component 140 is arranged to generally allow for additional information associated with members of the organizational chart to be overlaid or "mashed" on the chart in a manner often customizable be a user. This allows a user to view the information associated with members of the entity, while at the same time viewing the hierarchical relationship between the members. The mashing component 140 is coupled to the presentation component 110 to display results of the mashing operations. The mashing component 140 receives as input the information describing an organizational chart from the organizational database 160. The mashing component 140 may also receive additional input from custom code written by a user that defines what information is to be mashed with the organizational chart, and their respective sources. The mashing component 140 executes the custom code and retrieves the necessary information from each of the sources referenced in the custom code. The mashing component 140 determines where the information received from the custom code should be displayed on the organizational chart representing the organization, and generates display results describing the chart and any overlaid information.

The security component 150 is communicatively coupled to the presentation component 110, the search component 130, and the mashing component 140. The security component 150 is arranged to generally control accessibility to files storing organizational information based upon explicit security permissions or implicit security permissions. Implicit security permissions, for example, may be based on a position of a user within an organizational chart for an entity, a trusted relationship of a user with a member of an entity, and other rule-based determinations.

In one embodiment, for example, the security component 150 is operative to receive a request to modify a characteristic of the organizational chart from an operator, and access security settings for the operator. The security component 150 may authorize the operator to modify a characteristic of the organizational chart based on explicit or implicit security setting associated with the operator. The characteristic may include a node, hierarchical connections between nodes, or metadata associated with the nodes or connections. For example, the security component 150 may authorize the operator to modify a characteristic of the organizational chart when the operator is a delegate and a permission level for the delegate allows a modification operation associated with the modify request. The modification operations may include without limitation edit operations such as creating, deleting, adding, moving, copying, merging, splitting, and other conventional editing commands.

Figure 2:
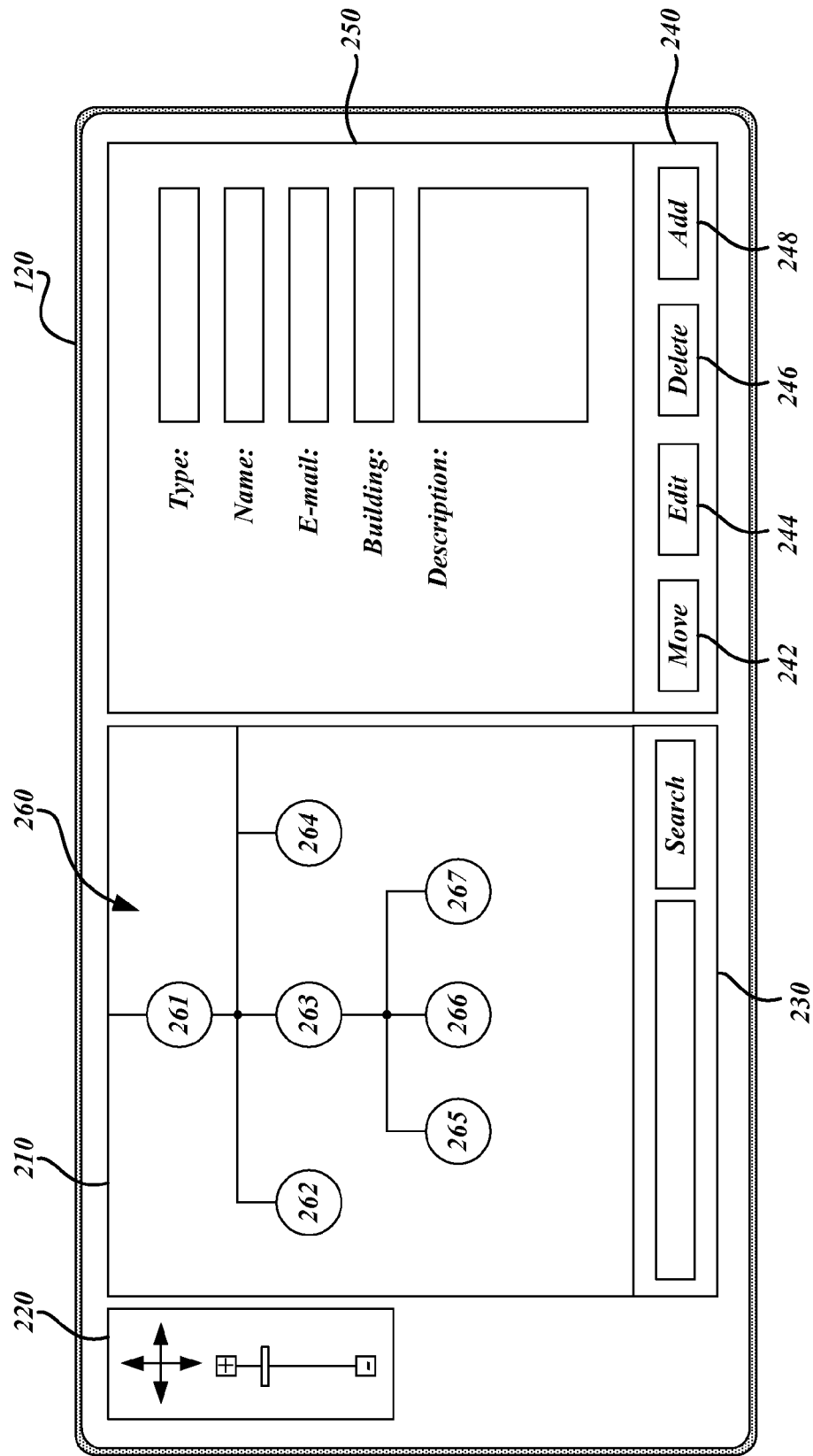
FIG. 2 illustrates an embodiment of a first organizational view.

FIG. 2 illustrates an implementation of the organization view 120 generated by the presentation component 110. The presentation component 110 may include a presentation surface 210, navigation controls 220, search controls 230, edit controls 240 and an input interface 250. The presentation surface 210 displays an organizational chart 260 of an entity. The presentation component 110 may allows multiple different users to access the organizational database 160 locally by a device implementing the organizational charting system 100, or over a network when implemented in a distributed computing environment. This allows multiple different users to modify portions of the chart while maintaining centralized storage of the organizational data.

The organizational chart 260 graphically represents the functional relationships between positions and groups of the entity. The organizational chart 260 includes nodes 261-267 that represent these positions and groups. Some of the nodes 261-267 may represent positions, such as a particular director, and some of the nodes 261-267 may represent particular project groups. For example, the node 263 represents a supervisory position within an entity. The position represented by the node 263 is responsible for supervising three project groups.

In some cases, the position may be occupied by an employee, and in other cases the position may be empty. For example, if an employee is hired to fill that position, the position will be occupied, and that employee will be responsible for supervising the three project groups. If that employee leaves or is eliminated, the position itself is not necessarily eliminated. For example, there may simply be an interim period where the entity is in the process of hiring a replacement. Thus, the position represented by the node 263 does not represent an individual employee, but rather, represents a position within the entity. As such, the node 263 may be displayed even when there is no employee occupying the position it represents.

The position represented by the node 263 is responsible for supervising the three project groups represented by the nodes 265, 266 and 267. Each of the nodes 265-267 may represent a project group that contains several employees, rather than representing one specific employee. Thus, the organizational chart 260 may represent the functional relationships between positions and groups within an entity.

The nodes 261-267 are connected by lines that indicate the hierarchical relationships between the positions and groups. For example, lines connect the top of the nodes 265, 266 and 267 to bottom of the node 263. These lines indicate that the node 263 is located higher than the nodes 265, 266 and 267 in the chart and, therefore, is responsible for controlling or managing the project groups represented by the nodes 265, 266 and 267.

In some examples, the organizational chart 260 may represent actual employees and the hierarchical relationship between them, rather than positions within an entity. In such examples, each node may represent a single employee such that when the employee is eliminated, so too is the node. In this manner, the organizational chart 260 may be used to indicate the supervisor-supervisee relationships between the individual employees of an entity.

The interface 26 also includes a set of navigation controls 220. The navigation controls 220 allow a user to adjust how the organizational chart 260 is displayed on the presentation surface 210. For example, the controls 220 may allow a user to adjust the zoom level of the presentation surface 210. A user may zoom in to magnify the chart, such that it is rendered in a larger size. By zooming in, a smaller portion of the organizational chart 260 may be displayed, and the portion that is displayed may be displayed in greater detail. A user may also use the navigation controls 220 to zoom out to decrease the magnification of the organizational chart 260, such that it is rendered in a smaller size. By zooming out, a larger portion of the organizational chart 260 may be displayed, but the portion that is displayed may be displayed in less details.

In some examples, when the zoom level of the organizational chart 260 is changed, individual nodes may be expanded or collapsed to regulate the portion of nodes that are displayed. For example, the nodes 265, 266 and 267 may each represent groups of multiple members. When the zoom level of the presentation surface 210 is increased beyond that shown in FIG. 2, the individual members may be displayed. Similarly, when the zoom level of the presentation surface 210 is decreased beyond that shown in FIG. 2, the node 263 that represents a supervisor may be collapsed, such that the nodes 265, 266 and 267 that represent the project groups supervised by the node 263 are no longer shown.

In addition to adjusting the zoom level of the presentation surface 210, the navigation controls 220 may also allow a user to pan the organizational chart 260. For example, when the user increases the zoom of the organizational chart 260, portions of the chart 260 may no longer be visible because the presentation surface 210 is of a finite size. In order to view those portions, the user may scroll to the left, right, up or down in order to bring the desired portion of the organizational chart 260 into view on the presentation surface 210.

In other examples, the navigation controls 220 may include other navigation abilities. In some examples, the navigation controls 220 may include controls to rotate the organizational chart 260. In other examples the navigation controls 220 may include controls to center the organizational chart 260. In still other examples, the user may navigate around the chart simply by using keyboard or mouse commands, without the need for visible navigation controls.

To further assist the user in locating information in the organizational chart 260, the interface surface 26 may also include search controls 230. The search controls 230 allow a user to input a search query that includes search terms, and search the organizational chart 260 for nodes associated with members that match the search terms. In some examples, the search controls 230 may allow the user to query for any metadata associated with the organizational chart 260. For example, the user may search by the name of the position, name of the employee occupying the position, or any other information associated with an employee or a particular position or group. The user may also search by a complex search query that searches for information in multiple types of metadata. Once the search is processed, the presentation surface 210 may then indicate the results of the search.

The presentation component 110 also includes a set of edit controls 240. The edit controls 240 allow a user to edit the organizational chart 260. The edit controls 240 may include command buttons, such as a move button 242, an edit button 244, a delete button 246 and an add button 248.

The move button 242 may allow a user to move nodes to alter their location in the hierarchical structure. In some examples, the presentation surface 210 may allow a user to select a node by, for example, clicking on the node with a mouse cursor. Once a node is selected, the user may activate a move feature by then selecting the move button 242. The user may reposition the selected node on the organizational chart 260. For example, the user may use a mouse to drag and drop the selected node. Once moved, updated metadata associated with the moved node is stored in the organizational database 160 to indicate the updated hierarchical relationship between the nodes. Thus, the move function not only allows a user to alter the position in which the node is displayed, but also allows the user to alter the node's position within the hierarchy.

The edit button 244 may allow a user to edit nodes. Each node may have metadata associated with it that a user may want to edit. For example, the node 263 may represent a supervisory position within the entity. The node 263 may thus be associated with metadata describing the position it represents. For example, the node 263 may be associated with metadata describing the name of the position, the e-mail address of the employee occupying the position, the building that the employee occupying the position resides in, and a general description of the position. Metadata may also describe the hierarchical relationship between that position and the other positions of the entity. A user may use the edit button 244 to edit the metadata associated with a node by, for example, selecting a node and then selecting the edit button 244. The user may then use the input interface 250 to modify the metadata associated with the selected node, as described below.

The delete button 246 may allow a user to delete a node. For example, the user may select a node and then select the delete button 246 to delete the selected node. In some examples, the user may be prompted with a warning message before the selected node is deleted.

The add button 248 may allow a user to add a new node within the organizational chart 260. The user may select a location in which to add the new node and then select the add button 248 to add the node. To select a location, the user may select an existing node and specify a hierarchical relationship, such as sibling, child, or parent. The new node may then be added to the chart based at a location relative to the new node based on the specified hierarchical relationship. In other examples, the user may simply add a node to the organizational chart 260 and later connect the new node into the hierarchical structure of the organizational chart 260. In still other examples, where no other nodes are present, the user need not select a location because the new node will function as the root node in the chart.

When adding a new node, the user may input any necessary metadata associated with the added node using the input interface 250. In other cases, the user may input the metadata associated with the added node by first adding the node, and then later using the edit button 244, as discussed above. Once added, metadata associated with the newly added node is stored in the organizational database 160. Additionally, metadata indicating the hierarchal relationship between the added node and the other nodes may be stored in the organizational database 160.

All users may not necessarily be permitted to use the edit controls 240. This is necessary to ensure a certain desired level of security is implemented to prevent unauthorized modifications to an organizational chart or corresponding organizational information. Whether a user is permitted to edit or modify an organizational chart or corresponding organizational information, is based on a set of explicit or implicit security permissions associated with a user or an organizational chart.

To accomplish this, the organizational charting system 100 includes the security component 150 to manage and control access to the organizational charting system 100 in general, and organizational information for an entity in particular. The security component 150 may implement a security model that allows varying levels of access to the organizational charting system 100 or particular organizational information for an entity in a manner that prevents unauthorized modifications while allowing authorized end users the ability to modify organizational information in a top down manner, bottom up manner, or any intermediate level therebetween. This ensures the organizational information stored by the organizational database 160 is efficiently updated and provides the type of organizational information important to the actual users of the organizational charting system 100, while limiting unauthorized access to sensitive or confidential information for an entity.

Users are not permitted to use the edit controls 240 unless authenticated and/or authorized by the security component 150. In some situations, for example, a user viewing the organizational chart 260 at the presentation component 110 may not be permitted to edit any portion of the organizational chart 260, and thus the edit controls 240 may be locked or hidden. In other situations, a user may be permitted to edit only defined portions of the organizational chart 260 based upon the user's location in the chart. For example, a user may only be permitted to edit portions of the chart over which they have supervisory authority. For example, a user may be the employee occupying the position represented by the node 263. As the position associated with the node 263 supervises the three project groups represented by the nodes 265, 266 and 267, the user may have permission to edit those nodes. Thus, the determination of whether a particular user has permission to edit a portion of the organizational chart 260 is somewhat responsive to the user's location within the chart.

In addition to having permission to edit the nodes that represent positions or groups that the user supervises, the user may also have the ability to delegate the permission to edit. For example, a user may allow his assistant to edit the portions of the chart that the user has permission to edit. In a default mode, all assistants can automatically be given delegation rights. A user can also explicitly delegate to users and groups of users (non-assistants). Delegation can also occur through the permissions levels mentioned elsewhere. For example, a user can choose that "user's management chain" (which means that the user's manager and his managers as computed dynamically) has rights to edit my profile. The user, however, may not delegate to others permission to edit portions of the chart that the user does not itself have permission to edit. In other examples, permission to edit may be set in another database that defines the portions of the chart each employee has permission to edit.

By allowing individual users to edit portions of the organizational chart 260, allows the organizational chart 260 to be efficiently created. Rather than confining the task of creating the chart to a designated individual or team, the task is distributed throughout the entity. This may not only save cost, but allow for the creation of a much more detailed chart. For example, when the task of creating an organizational chart is delegated to a single group, it is often cost prohibitive to create a comprehensive chart of the complete entity. Due to the lesser burden distributing the charts creation generates, the creation of a comprehensive chart of even the largest entity becomes practicable. Further, distributing the editing and creation allows organizational charts to include much more information than that previously realizable.

Figure 3:
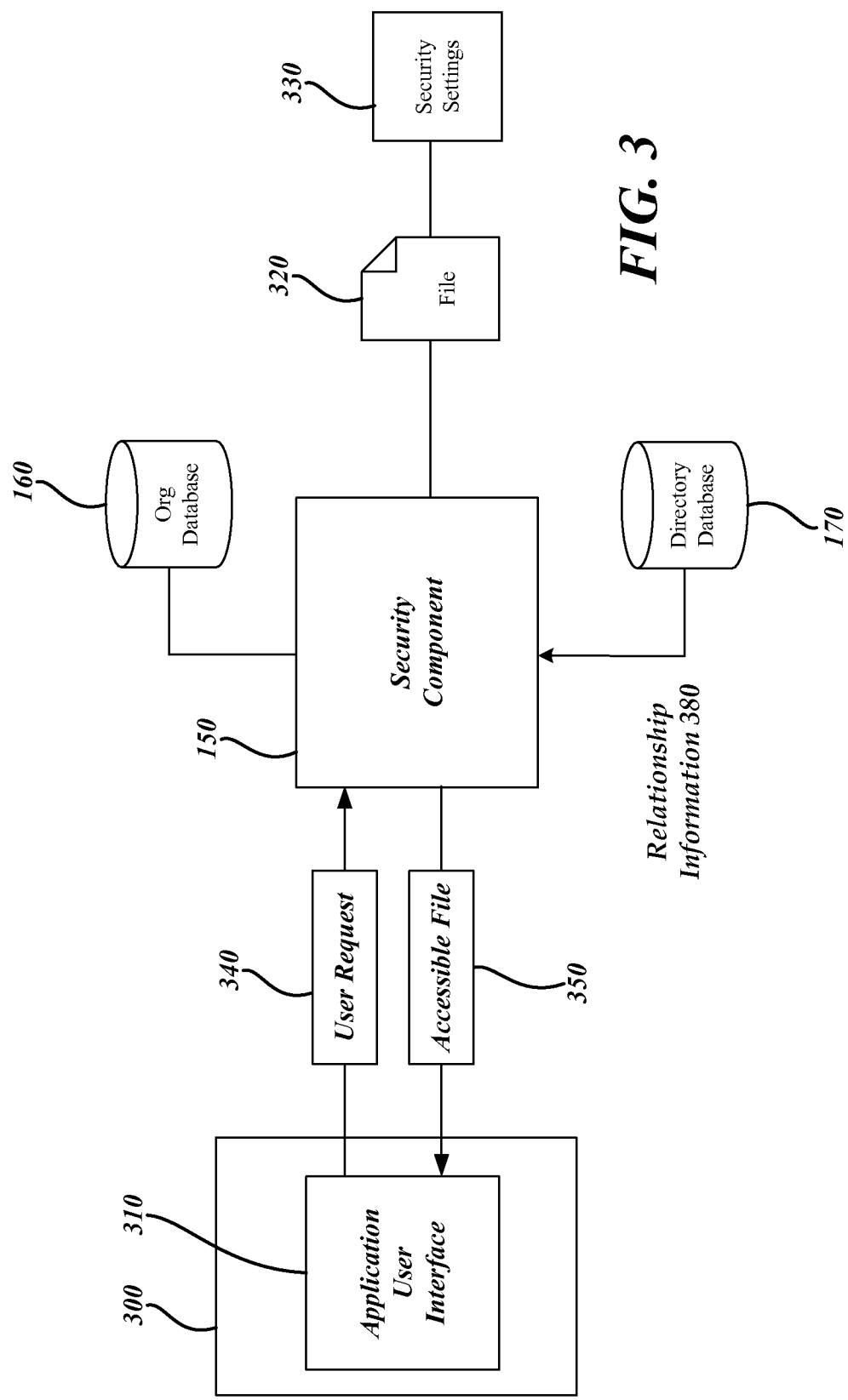
FIG. 3 illustrates an embodiment of security component.

FIG. 3 illustrates an implementation of a security component 150. The security component 150 controls the accessibility of files based upon the hierarchical relationships between members displayed in the organizational chart 260. The security component 150 is coupled to an application user interface 310 of an application 300. The application 300 may be any computer application that accesses files, such as a file 320. The file 320 may store organizational information for an entity, such as organizational information suitable for presenting the organizational chart 260 for the entity. The security component 150 is also coupled to the organizational database 160, the directory database 170, and the file 320. The file 320 is associated with a security settings 330 that define the accessibility of the file 320. Although shown as separate from the databases 160, 170, it may be appreciated that the file 320 and security settings 330 may be stored in one or both of the databases 160, 170. The embodiments are not limited in this context.

The security component 150 may receive a request 340 to access the file 320 from the application user interface 310. The security component 150 retrieves the security settings 330 associated with the file 320. The security settings 330 may define the accessibility of the file 320 based on a location of the user accessing the file in the organizational chart. For example, the file 320 may only be accessible to a particular project group. In other examples, the file 320 may only be accessible to individuals higher in the hierarchy than a defined reference position.

Upon receiving a request 340 to access the file 320, the security component 150 then accesses the organizational database 160 to determine the position of the user making the request 340. Based on where the individual is located in the organizational chart 260 and the security settings 330, the security component 150 allows or denies access 350 to the file 320. In this way, the hierarchical information associated with the chart 260 may control the accessibility of files being accessed by other applications. Further, security permissions of members may, therefore, be defined as metadata associated with of the chart 260. This reduces the need for both an organizational chart and a separate list of security permission. Further, by integrating security permissions with the organizational data, security permissions may be defined based on the structure of an entity.

The security component 150 may authorize an operator to view and/or modify a characteristic of the organizational chart based on the security settings 330. The security settings 330 may be stored by the organizational database 160, the directory database 170, or another network device. The security settings 330 may define various security rules, security operations, and security information needed to implement the security rules and security operations to authenticate and/or authorize access to organization information stored by the organizational database 160.

The security settings 330 may include different types of security properties. One example of a security property may include without limitation a delegate property. In various embodiments, the delegate property may be associated with an organization profile object or a member profile object. In one embodiment, for example, the organizational database 160 stores in a database accessible by members of an organization an operator identifier for an operator as a delegate property of a member profile object associated with the member from the organization. The delegate property may be used to allow a member of an organization to delegate permission to modify organizational information stored by the organizational database 160 to trusted users, such as another member of the organization, or a consultant outside of the organization. For example, a user may allow his assistant to edit the portions of the chart that the user has permission to edit. The user, however, may not delegate to others permission to edit portions of the chart that the user does not itself have permission to edit. In other examples, permission to edit may be set in another database that defines the portions of the chart each employee has permission to edit. The delegate property may therefore allow certain users to be added to a delegate group, with the delegate group having permissions similar to the delegating member of an organization.

The security settings 330 may also include a security property such as an attach sub-organization permission property. In one embodiment, the organizational database 160 may store in a database accessible by members of an organization an operator identifier for an operator as an attach sub-organization permission property of an organization profile object associated with the organization. The attach sub-organization permission property for the organization profile object may allow the operator to create a new sub-organization a hierarchical level below a node. The attach sub-organization permission property for the organization profile object may allow an existing sub-organization to be attached a hierarchical level below the node.

The security settings 330 may also include a security property such as an edit organization permission property. In one embodiment, the organizational database 160 may store in a database accessible by members of an organization an operator identifier for an operator as an edit organization permission property of an organization profile object associated with the organization. The edit organization permission property for the organization profile object may allow the operator to create or modify a node or a connection between nodes.

Additionally or alternatively, the edit organization permission property may be associated with a member profile object. In one embodiment, for example, the organizational database 160 may store in a database accessible by members of the organization an operator identifier for an operator as an edit organization permission property of a member profile object associated with a member of the organization. The edit organization permission property for the member profile object may allow the operator to create an organizational chart for the member of the organization.

For reference, an exemplary permission matrix for the security component 150 may be shown in Table 1 as follows:

TABLE 1

| Object Type | Edit | Attach Sub-Organization |
|---|---|---|
| Organization | Edit the org profile<br>Delete the org<br>Move the org (requires attach on the parent)<br>Add/remove members | Allow creating a new suborg and attach it underneath the target org<br>Allows setting the parent of an org to be the target org<br>Security trims the "new" link on the org |
| Member | Edit the user profile | Allow creating a new suborg and attach it underneath the target user's manager<br>Allows setting the parent of an org to be the target user's manager or the target user<br>Security trims the "create organization" link on the user card |

In general operation, the security component 150 receives a request to modify a characteristic of the organizational chart from an operator, accesses the security settings 330 for the operator, and authorizes the operator to modify a characteristic of the organizational chart when the operator is a delegate and a permission level for the delegate allows a modification operation associated with the modify request. Whether the operator is a delegate and has the appropriate permission level may be determined using the security settings 330, or more particularly, the delegate property, the attach sub-organization permission property, and/or the edit organization permission property. The permission levels may vary by implementation. In one embodiment, for example, the permission levels may be defined as shown in Table 2 as follows:

TABLE 2

| Permission level | User Equivalent | Examples |
|---|---|---|
| Service administrators only | Service administrators only | |
| Leaders' and delegates | User and delegates | User |
| Leaders' management chain | User's management chain | User Manager |
| Leaders' direct reports | User's direct reports | Team or Group Members |
| Everyone | Everyone | Everyone |

Additionally or alternatively, the security component 150 may authorize an operator to view and/or modify a characteristic of the organizational chart based on security considerations not explicitly defined by the security settings 330. In some cases, the security component 150 may receive the user request 340 from an operator that does not have any security information defined for him or her by the security settings 330. In this case, the security component 150 may automatically deny access to the file 320. In other cases, however, the security component 150 may use implicit security permissions derived using a set of heuristics or security rules. For example, the security component 150 may access identifying information from the organizational database 160 and/or the directory database 170 to determine whether the user request 340 should be granted or denied. As previously described, a user may be the employee occupying the position represented by the node 263. As the position associated with the node 263 supervises the three project groups represented by the nodes 265, 266 and 267, the user may have permission to edit those nodes. Thus, the determination of whether a particular user has permission to edit a portion of the organizational chart 260 is determined based on the user's location within the organizational chart 260. In another example, the security component 150 may determine whether to grant the user request 340 based on a trusted relationship between the operator sending the user request 340 and a member of the organization. For example, the security component 150 may determine that the user request 340 came from a consultant working on a project with the employee occupying the position represented by the node 263. The security component 150 may determine that the consultant may access the organizational chart 260 based on this trusted relationship and its definition of a consultant. An alternative type of permission level could be the position (or role) of the user. For example, a user could set permissions that all "business administrators" and "director-level employees" should have permission to edit all or part of the org chart. Many other rules or heuristics may be implemented to determine whether an operator has implicit security permissions to access and modify a particular organizational chart and/or organizational information. The embodiments are not limited in this context.

Figure 4:
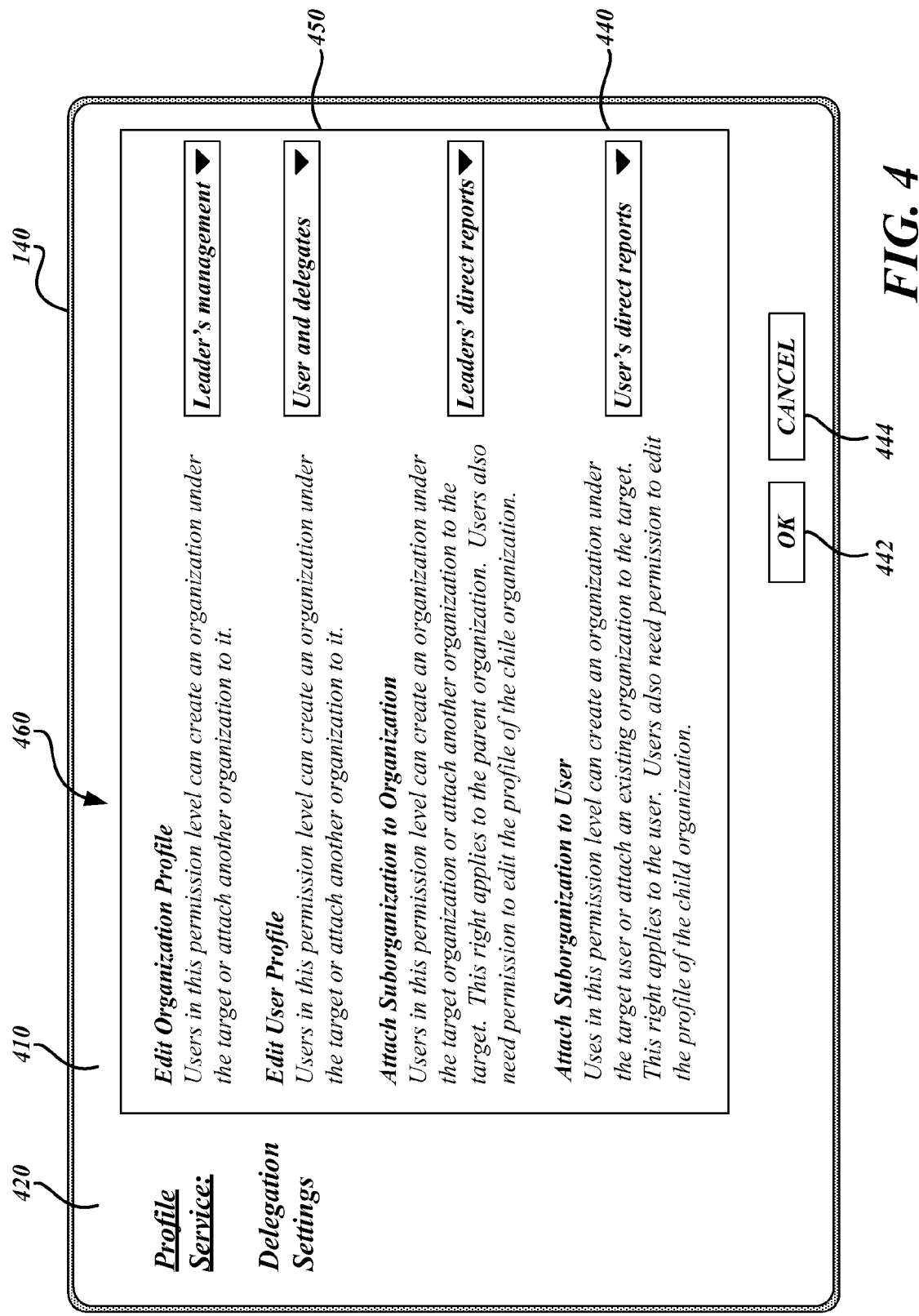
FIG. 4 illustrates an embodiment of a profile service view.

FIG. 4 illustrates an implementation of a profile service view 140 generated by the presentation component 110. The profile service view 140 allows a user to set default permissions for various profiles. In the illustrated embodiment shown in FIG. 4, the profile service view 140 to specify permission levels to delegate profile management operations, including an edit organization profile, an edit user profile, an attach sub-organization to organization profile, and an attach sub-organization to user profile. Each of the profiles may be assigned a different permission level as shown in Table 2 using a drop-down menu element.

Figure 5:
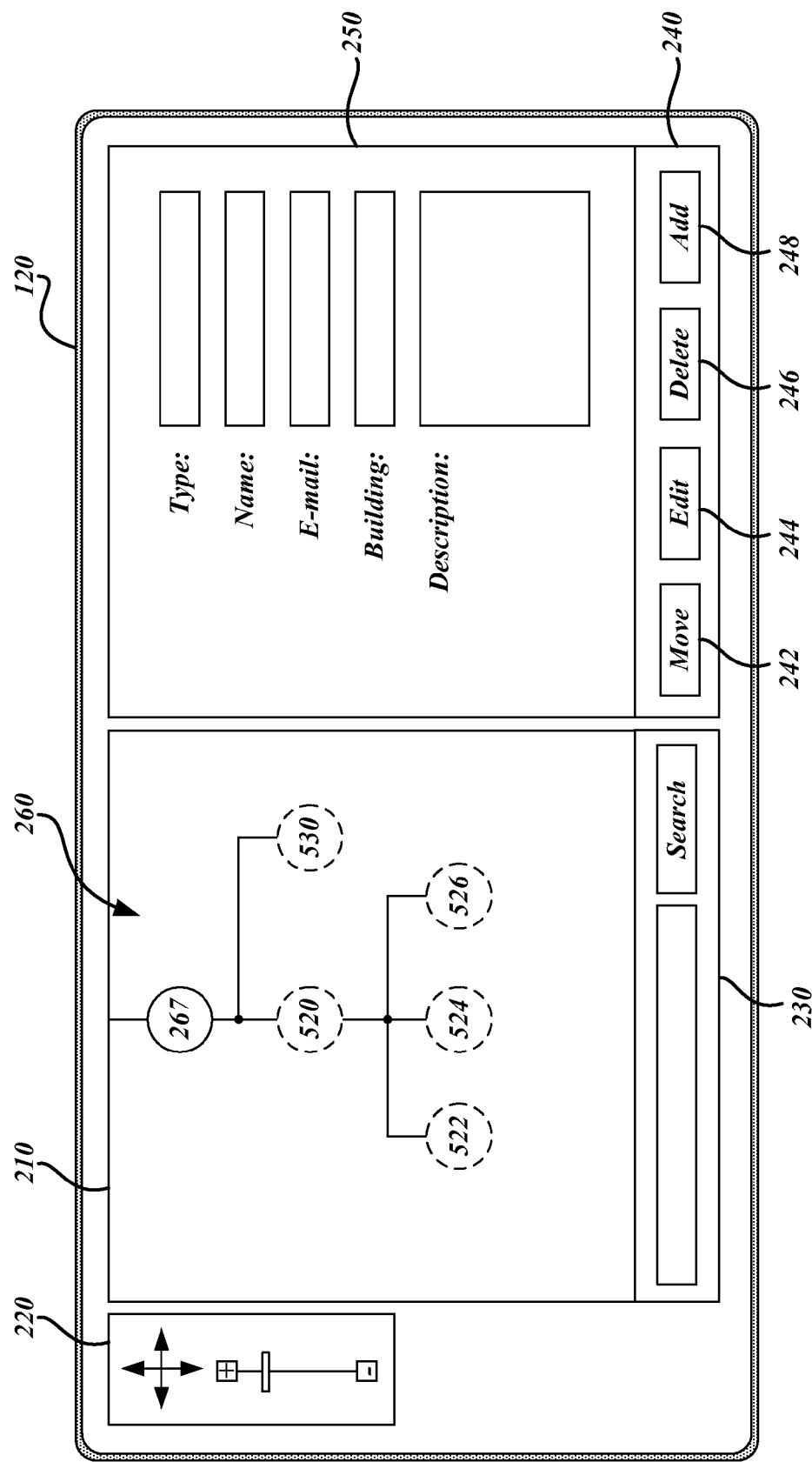
FIG. 5 illustrates an embodiment of a second organizational view.

FIG. 5 illustrates an implementation of the organization view 120 generated by the presentation component 110. In the illustrated embodiment shown in FIG. 5, the organization view 120 illustrates a case where an operator desires to modify the organizational chart 260 by creating and attaching a new sub-organization to the node 267. Assume a use scenario where an operator Laura has a product entering a new product cycle, and as the new organizational structure takes shape she wants the organizational chart 260 to reflect the changes. By default, she has the right to manage her level and below but she wants to delegate this task to Ben, one of her reports. Ben sends the user request 340 to the security component 150 to modify the organizational chart 260 as represented by the file 320. The security component 150 receives the user request 340, and determines whether Ben has permission to access and edit the file 320 using the security settings 330. Once the presentation component 150 authorizes Ben to access the organizational information represented by the file 320, Ben may use the presentation component 110 to create a new sub-organization comprising nodes 520, 522, 524, 526 and 530. Ben may create connections between the nodes 520, 530 to show a peer relationship where the nodes 520, 530 are on the same hierarchical level. Ben may also create connections between the node 520 and the nodes 522, 524 and 526 to show a hierarchical relationship where the nodes 522, 524 and 526 are a hierarchical level below the hierarchical level 520. Once Ben creates the new sub-teams and assigns people to them, he then submits his changes back to Lauren, who can verify the changes. After her approval, the new structure becomes visible to everyone.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may present an organizational chart on a presentation surface, the organizational chart comprising multiple nodes associated with members of an organization, and connections between the nodes representing hierarchical relationships between the nodes at block 602. For example, the presentation component 110 may present an organizational chart 260 on a presentation surface 210, the organizational chart 260 comprising multiple nodes 261 through 267 associated with members of an organization, and connections between the nodes representing hierarchical relationships between the nodes The logic flow 600 may receive a request to modify a characteristic of the organizational chart from an operator at block 604. For example, the security component 150 may receive a user request 340 to modify a characteristic of the organizational chart 260 from an operator via an application 300 and application user interface 310.

The logic flow 600 may determine whether the operator is a delegate of a member from the entity at block 606. For example, the security component 150 may determine whether the operator is a delegate of a member from the entity using the delegate property.

The logic flow 600 may determine a permission level associated with the delegate at block 608. For example, the security component 150 may determine a permission level associated with the delegate using the permission properties.

The logic flow 600 may authorize the operator to modify the characteristic of the organizational chart in response to the modify request when the operator is a delegate and the permission level allows a modification operation associated with the modify request at block 608. For example, the security component 150 may authorize the operator to modify the characteristic of the organizational chart 260 in response to the user request 340 when the operator is a delegate and the permission level allows a modification operation associated with the modify request.

In addition to the above-described embodiments, other embodiments may set implicit or explicit permission levels based on a position of a given user in both a reporting hierarchy and an organizational hierarchy. In some cases, the reporting hierarchy and the organizational hierarchy for an organization may be similar or the same. In other cases, however, the reporting hierarchy and the organizational hierarchy for an organization might be different. An example that highlights the differences between a reporting hierarchy and an organizational hierarchy may be given as follows. Assume Joe is the legal representative for the East Coast Project and a member of that team. Joe reports to Jeff, who leads the legal department, which is unrelated to the East Coast Project in the hierarchy. In embodiments, implicit or explicit permissions may be allocated with respect to the reporting hierarchy alone, the organizational hierarchy alone, or both the reporting hierarchy and the organizational hierarchy together, based on the inter-relationships between the different hierarchies. The embodiments are not limited in this context.

Figure 7:
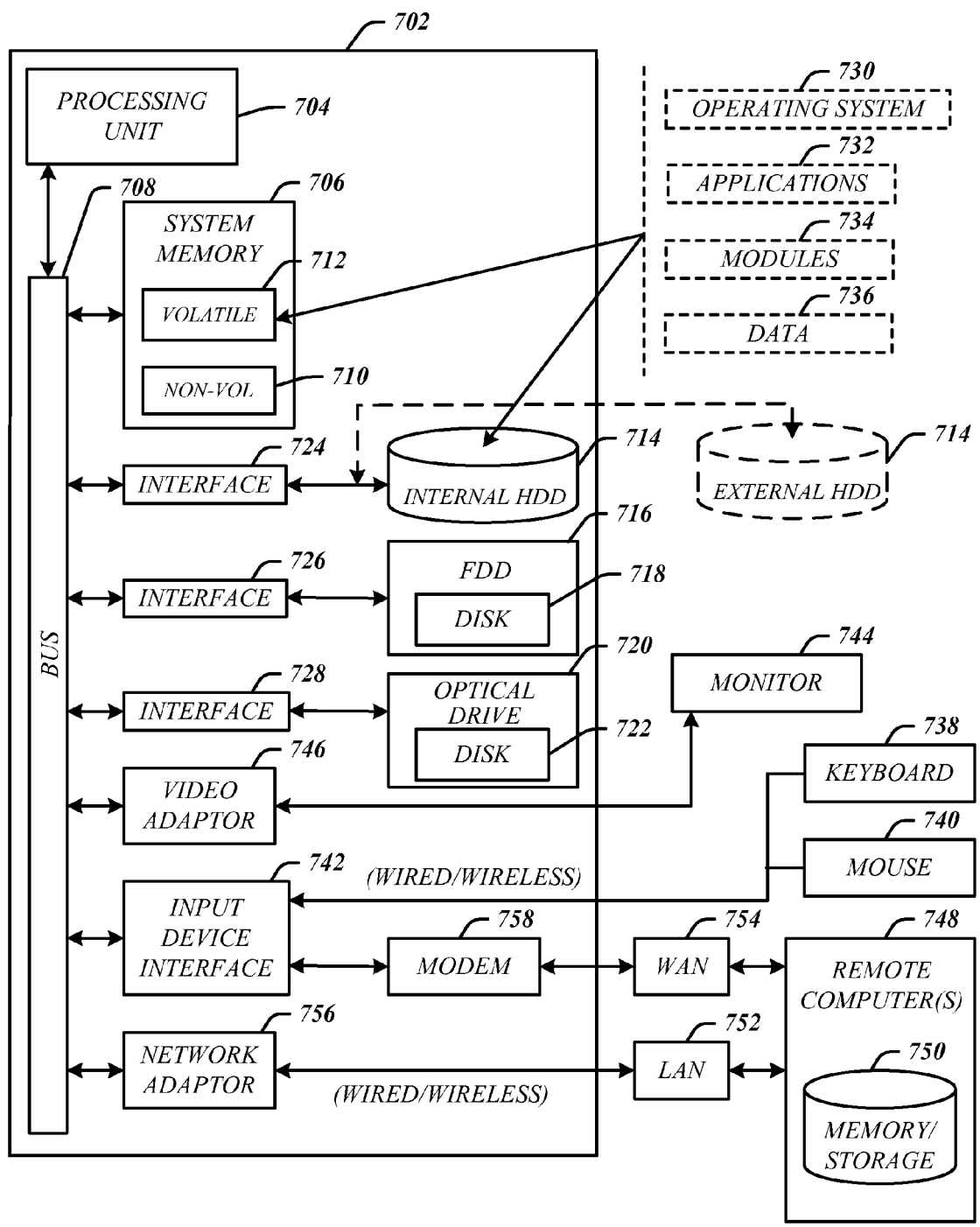
FIG. 7 illustrates an embodiment of a computing architecture.

FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, the various elements of the organizational charting system 100, such as the presentation component 110, the search component 130, the mashing component 140, and/or the security component 150.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
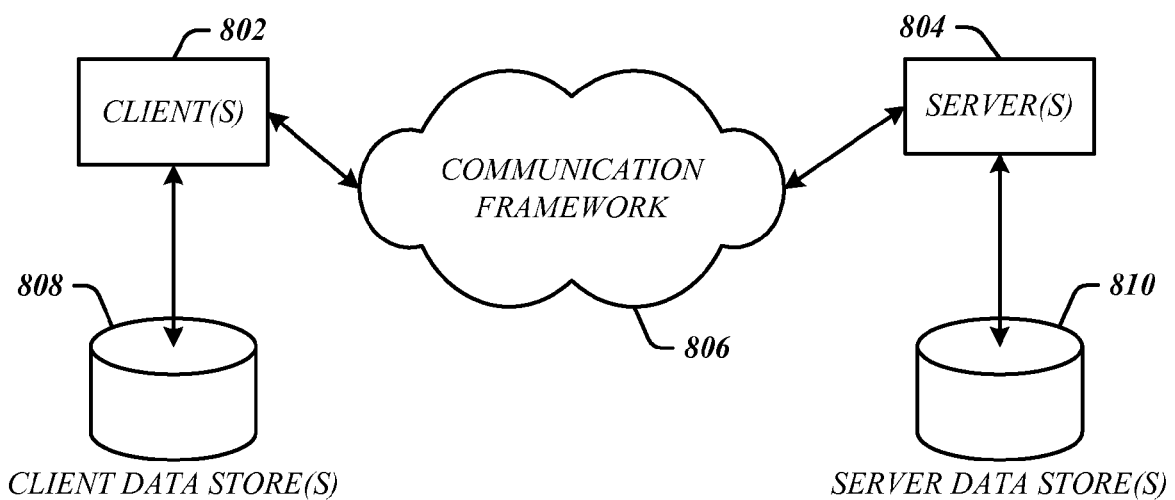
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 and servers 804 may implement some or all of the organizational charting system 100. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   presenting an organizational chart on a presentation surface, the organizational chart comprising multiple nodes associated with members of an organization, and connections between the nodes representing hierarchical relationships between the nodes;
   receiving custom code from an operator that defines additional information and specifies a source of the additional information for overlaying on the organizational chart;
   executing the custom code to retrieve the additional information from the specified sources;
   determining where to display the retrieved additional information on the organizational chart;

overlaying the retrieved additional information associated with members of the organization on the nodes of the organizational chart associated with the members, in accordance with the determining;

receiving a request to modify a characteristic of the organizational chart from the operator;

determining whether the operator is a delegate of a member from the organization;

determining a permission level associated with the delegate based on a position of the node associated with the operator in the organizational chart and not based on the member associated with the node; and authorizing the operator to modify the characteristic of the organizational chart in response to the modify request when the operator is a delegate and the permission level allows a modification operation associated with the modify request.

2. The method of claim 1, comprising storing an operator identifier for the operator as a delegate property of a member profile object associated with the member from the organization.

3. The method of claim 1, comprising storing an operator identifier for the operator as a permission property of an organization profile object associated with the organization.

4. The method of claim 3, the permission property for the organization profile object to allow the operator to create a new sub-organization a hierarchical level below a node, or attach an existing sub-organization a hierarchical level below the node.

5. The method of claim 3, the permission property for the organization profile object to allow the operator to create or modify a node or a connection between nodes.

6. The method of claim 1, comprising storing an operator identifier for the operator as a permission property of a member profile object associated with a member of the organization.

7. The method of claim 1, the permission property for the member profile object to allow the operator to create an organizational chart for the member of the organization.

8. The method of claim 1, comprising modifying a characteristic of the organizational chart, the characteristic comprising a node for the organizational chart, a connection between nodes for the organizational chart, or metadata for the organizational chart.

9. An apparatus, comprising:
a presentation component operative to present an organizational chart on a presentation surface, the organizational chart comprising multiple nodes associated with members of an organization, and connections between the nodes representing hierarchical relationships between the nodes;

a mashing component operative to receive custom code from an operator that defines additional information and specifies a source of the additional information for overlaying on the organizational chart, execute the custom code to retrieve the additional information from the specified sources, determine where to display the retrieved additional information on the organizational chart, and overlay additional information associated with members of the organization on the nodes of the organizational chart associated with the members, in accordance with the determining; and a security component communicatively coupled to the presentation component, the security component operative to receive a request to modify a characteristic of the organizational chart from the operator, access security settings for the operator based on a position of the node associated with the operator in the organizational chart and not based on the member associated with the node, and authorize the operator to modify a characteristic of the organizational chart when the operator is a delegate and a permission level for the delegate allows a modification operation associated with the modify request.

10. The apparatus of claim 9, comprising an organizational database to store in a database accessible by members of the organization member data representing members of the organization, hierarchical data representing hierarchical relationships between the members of the organization, and metadata associated with the members.

11. The apparatus of claim 9, comprising an organizational database to store in a database accessible by members of the organization an operator identifier for the operator as a delegate property of a member profile object associated with the member from the organization.

12. The apparatus of claim 9, comprising an organizational database to store in a database accessible by members of the organization an operator identifier for the operator as a permission property of an organization profile object associated with the organization.

13. The apparatus of claim 12, the permission property for the organization profile object to allow the operator to create a new sub-organization a hierarchical level below a node, or attach an existing sub-organization a hierarchical level below the node.

14. The apparatus of claim 12, the permission property for the organization profile object to allow the operator to create or modify a node or a connection between nodes.

15. The apparatus of claim 9, comprising an organizational database to store in a database accessible by members of the organization an operator identifier for the operator as a permission property of an member profile object associated with a member of the organization, the permission property for the member profile object to allow the operator to create an organizational chart for the member of the organization.

16. The apparatus of claim 9, the presentation component operative to modify a characteristic of the organizational chart, the characteristic comprising a node for the organizational chart, a connection between nodes for the organizational chart, or metadata for the organizational chart.

17. An article comprising a computer-readable storage medium, not comprising a signal, containing instructions that when-executed cause a system to:
present an organizational chart on a presentation surface, the organizational chart comprising multiple nodes associated with members of an organization, and connections between the nodes representing hierarchical relationships between the nodes;

receive custom code from an operator that defines additional information and specifies a source of the additional information for overlaying on the organizational chart;

execute the custom code to retrieve the additional information from the specified sources;

determine where to display the retrieved additional information on the organizational chart;

overlay additional information associated with members of the organization on the nodes of the organizational chart associated with the members, in accordance with the determining;

receive a request to modify a characteristic of the organizational chart from the operator; and authorize the operator to modify the characteristic of the organizational chart in response to the modify request when the operator is a delegate and the delegate has a permission level based on a position of the node associated with the operator in the organizational chart, and not based on the member associated with the node, that allows a modification operation associated with the modify request.

18. The article of claim 17, further comprising instructions that when executed cause the system to store an operator identifier for the operator as a permission property of an organization profile object associated with the organization, the permission property for the organization profile object to allow the operator to create a new sub-organization a hierarchical level below a node, attach an existing sub-organization a hierarchical level below the node, or allow the operator to create or modify a node or a connection between nodes.

19. The article of claim 17, further comprising instructions that when executed cause the system to store an operator identifier for the operator as a permission property of an member profile object associated with a member of the organization, the permission property for the member profile object to allow the operator to create an organizational chart for the member of the organization.

20. The article of claim 17, further comprising instructions that when executed cause the system to modify a characteristic of the organizational chart, the characteristic comprising a node for the organizational chart, a connection between nodes for the organizational chart, or metadata for the organizational chart.

* * * * *